United States Patent
Tu et al.

(10) Patent No.: US 9,898,841 B2
(45) Date of Patent: Feb. 20, 2018

(54) SYNCHRONIZING DIGITAL INK STROKE RENDERING

(71) Applicant: Microsoft Technology Licensing, LLC, Redmond, WA (US)

(72) Inventors: Xiao Tu, Medina, WA (US); Walker Duhon, Seattle, WA (US); Jason Hartman, Woodinville, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 160 days.

(21) Appl. No.: 14/873,021

(22) Filed: Oct. 1, 2015

(65) Prior Publication Data

US 2016/0379385 A1 Dec. 29, 2016

Related U.S. Application Data

(60) Provisional application No. 62/186,244, filed on Jun. 29, 2015.

(51) Int. Cl.
*G06T 11/20* (2006.01)
*G06F 3/0488* (2013.01)
(Continued)

(52) U.S. Cl.
CPC ........ *G06T 11/203* (2013.01); *G06F 3/04883* (2013.01); *G06F 3/1454* (2013.01);
(Continued)

(58) Field of Classification Search
None
See application file for complete search history.

(56) References Cited

U.S. PATENT DOCUMENTS 6,707,473 B2   3/2004   Dresevic et al.
6,965,384 B2   11/2005  Lui et al.
(Continued)

FOREIGN PATENT DOCUMENTS

WO   2015075930 A1   5/2015

OTHER PUBLICATIONS

ISA European Patent Office, International Search Report and Written Opinion Issued in PCT Application No. PCT/US2016/039143, dated Sep. 16, 2016, WIPO, 13 pages.
(Continued)

*Primary Examiner* — Mark Zimmerman
*Assistant Examiner* — Yu-Jang Tswei
(74) *Attorney, Agent, or Firm* — Alleman Hall Creasman & Tuttle LLP

(57) ABSTRACT

A method for operating a computing system is provided. The method includes at a local computing device and while an ink input is occurring, rendering a local uncommitted ink stroke on a local display based on the ink input and sending uncommitted ink data corresponding to the uncommitted ink stroke to a remote computing device, the uncommitted ink data including an uncommitted ink stroke path and a global unique identifier differentiating the uncommitted ink data from other uncommitted ink data corresponding to different computing devices and ink inputs. The method further includes responsive to receiving an ink stroke commitment input, rendering a local committed ink stroke on the local display and sending committed ink data including an ink commitment command and the global unique identifier associated with the uncommitted ink stroke path to the remote computing device.

19 Claims, 5 Drawing Sheets

(51) Int. Cl.
*G06F 3/14* (2006.01)
*G06T 1/20* (2006.01)
*H04M 3/56* (2006.01)
*H04N 7/14* (2006.01)
*G06Q 10/10* (2012.01)

(52) U.S. Cl.
CPC ............... *G06T 1/20* (2013.01); *H04M 3/567* (2013.01); *H04N 7/14* (2013.01); *G06Q 10/10* (2013.01)

(56) References Cited

U.S. PATENT DOCUMENTS

| | | |
|---|---|---|
| 7,004,390 B2 | 2/2006 | Silverbrook et al. |
| 7,123,770 B2 | 10/2006 | Raghupathy et al. |
| 7,199,885 B2 | 4/2007 | Dodge et al. |
| 7,373,590 B2 | 5/2008 | Woolf et al. |
| 7,907,141 B2 | 3/2011 | Saund |
| 8,072,433 B2 | 12/2011 | Silverman et al. |
| 8,407,589 B2 | 3/2013 | Ye et al. |
| 2006/0010368 A1 | 1/2006 | Kashi |
| 2006/0271580 A1 | 11/2006 | Ye et al. |
| 2009/0251338 A1 | 10/2009 | Marggraff et al. |
| 2009/0282124 A1* | 11/2009 | Rauhala ............ G06F 17/30165 709/216 |
| 2010/0083109 A1 | 4/2010 | Tse et al. |
| 2013/0033429 A1 | 2/2013 | Silverbrook |
| 2013/0307861 A1 | 11/2013 | Lang et al. |
| 2014/0033215 A1* | 1/2014 | Otomo ............... G06F 9/505 718/102 |
| 2014/0118314 A1 | 5/2014 | Black et al. |
| 2014/0240322 A1 | 8/2014 | Brumer et al. |
| 2014/0380193 A1 | 12/2014 | Coplen et al. |
| 2015/0116226 A1 | 4/2015 | Goins et al. |

OTHER PUBLICATIONS

Keshari, et al., "Sharing Digital Ink in Heterogeneous Collaborative Environments", In Proceedings of the IAPR International Conference on Frontiers in Handwriting Recognition, Aug. 19, 2008, 6 pages.

Ambrosio, et al., "Digital Ink as a Collaborative Learning Support", In Proceedings of the First International Conference on Computer Supported Education, Mar. 23, 2009, 6 pages.

* cited by examiner

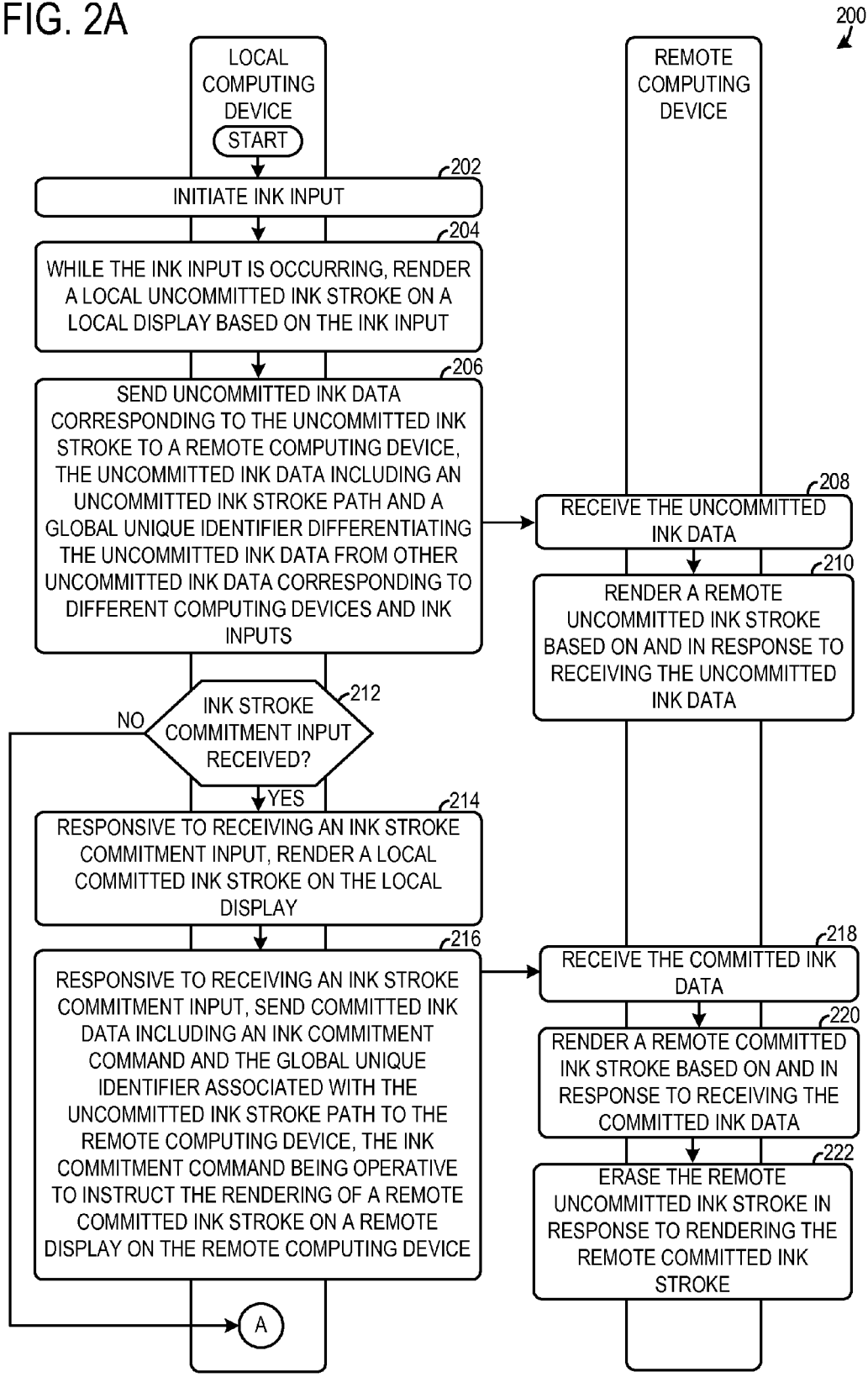

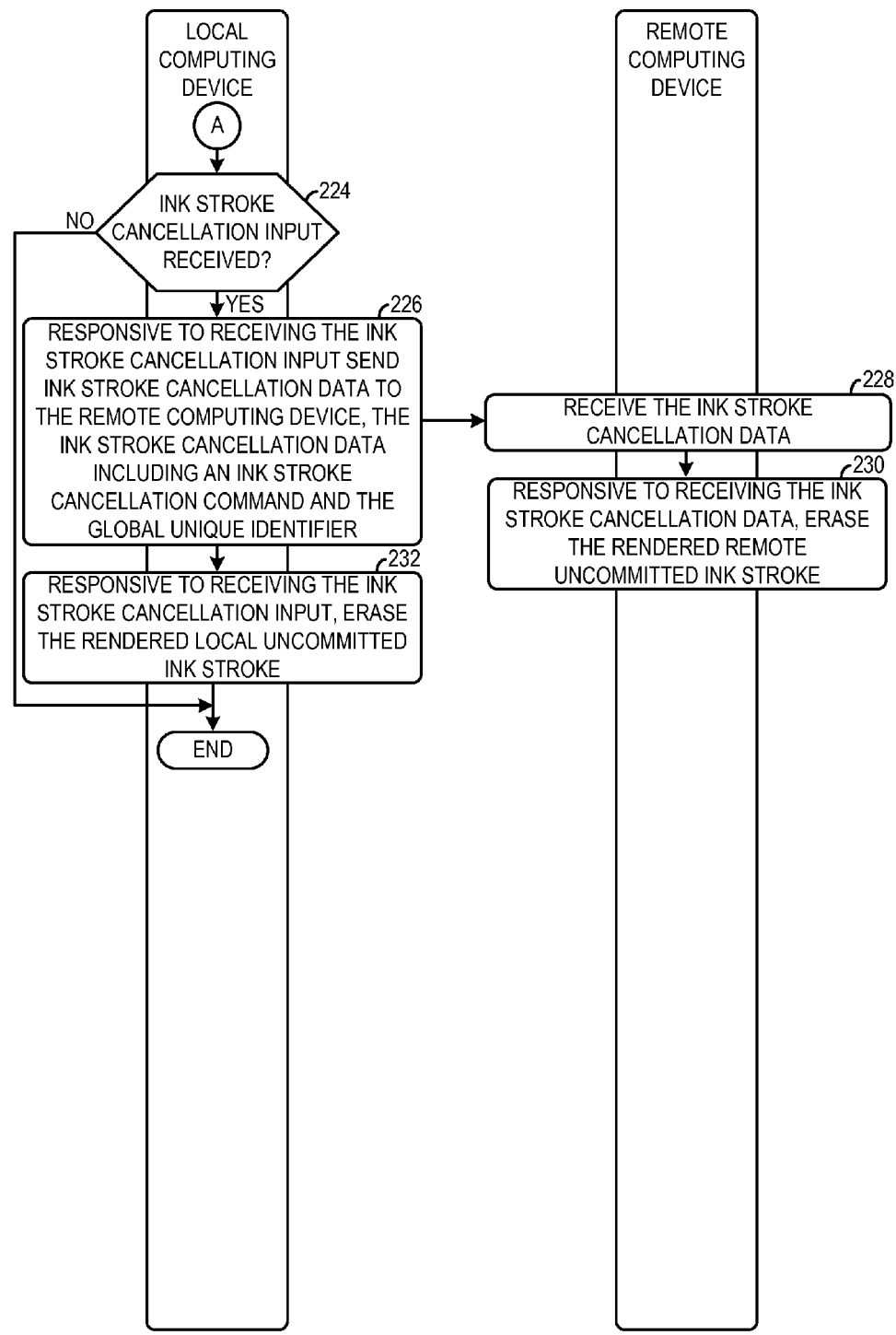

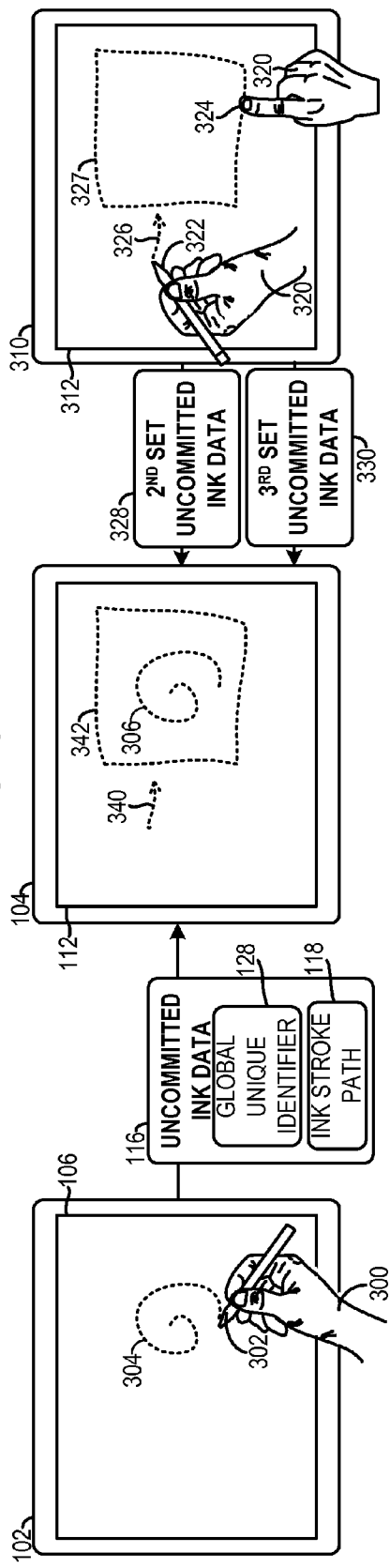
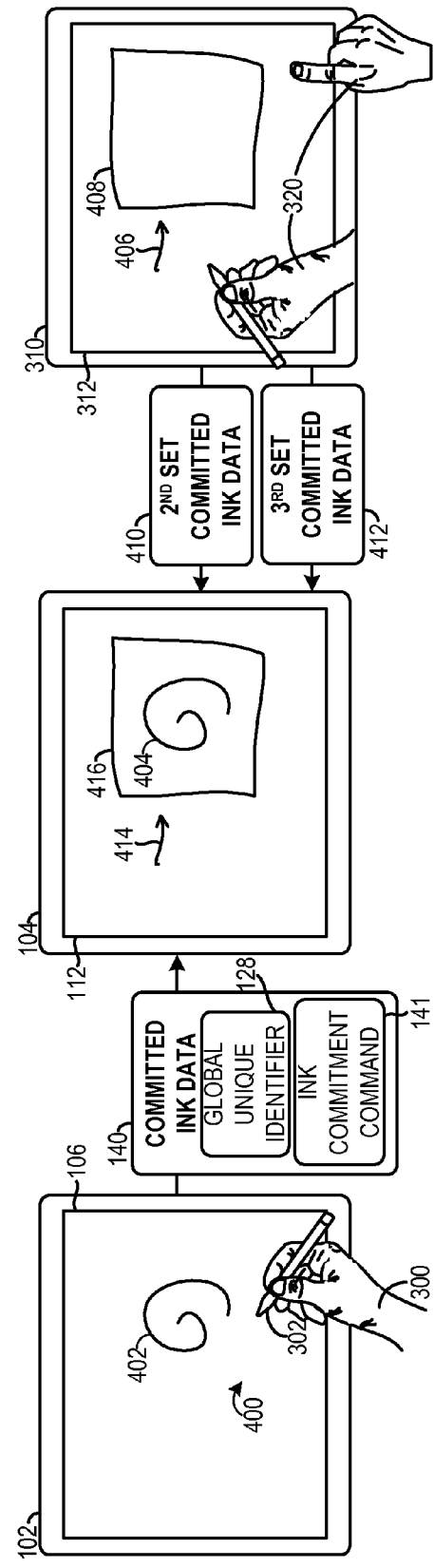

SYNCHRONIZING DIGITAL INK STROKE RENDERING

CROSS REFERENCE TO RELATED APPLICATIONS

This application claims priority to U.S. Provisional Patent Application No. 62/186,244, filed Jun. 29, 2015, entitled "SYNCHRONIZING DIGITAL INK STROKE RENDERING", the entirety of which is hereby incorporated herein by reference.

BACKGROUND

Some computing systems enable multiple computing devices to interact with one another to provide collaborative ink rendering. In practice, these systems are often challenged when handling ink sources from multiple devices, users, fingers, pens, etc. In some cases, rendering occurs with unacceptable delay, jitter, gaps or other undesirable visual artifacts, detracting from the collaborative experience. In other settings, various challenges can arise from differentiating ink sources, properly coordinating ink activity at target devices, and efficiently and dynamically allocating computing resources on ink source and ink target devices.

BRIEF DESCRIPTION OF THE DRAWINGS

FIGS. 2A-2B shows a method for coordinating ink stroke rendering;

FIGS. 3-4 show an example use case scenario for synchronizing ink stroke rendering.

DETAILED DESCRIPTION

Figure 1:
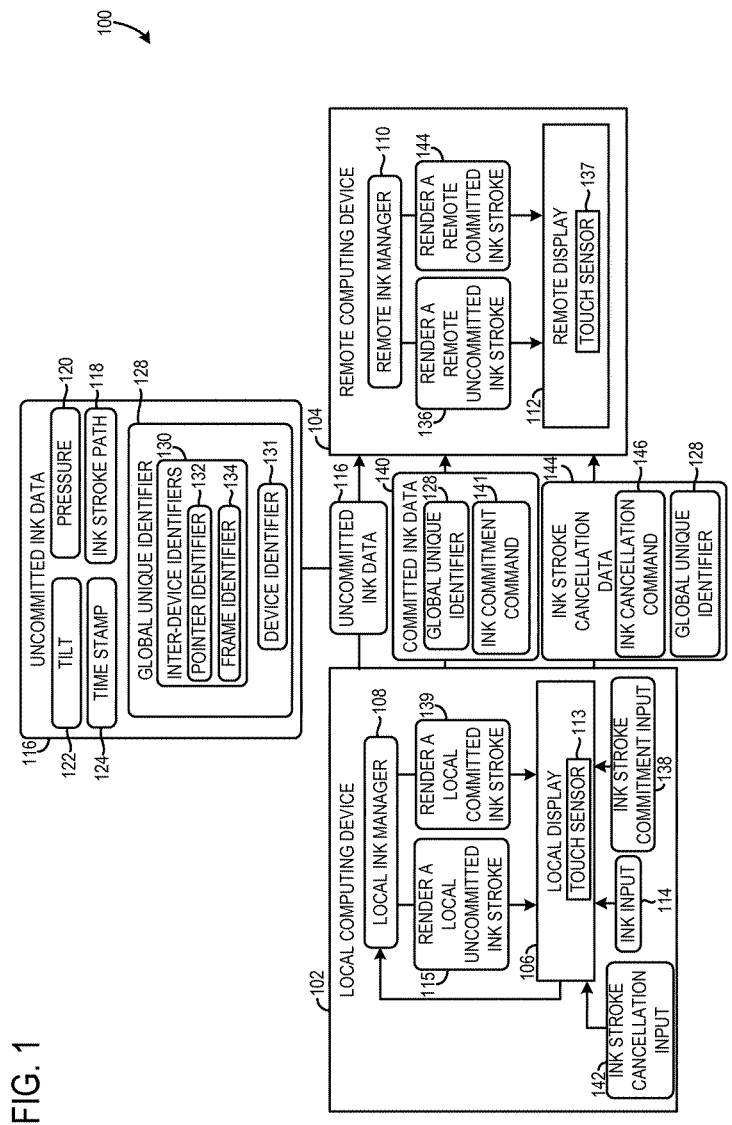
FIG. 1 depicts an example computing system for coordinating ink stroke rendering on multiple computing devices.

The present description contemplates example systems/methods that provide a collaborative environment where ink inputs and rendered ink outputs may be efficiently coordinated across multiple participating devices in physically proximate and/or distant locations. Inputs/outputs may be applied and viewed by many participants. Actively inking users may do so from any source/local machine and have those source inputs transmitted to any target/remote machines for rendering.

Inking in the collaborative environment may be generated by multiple different (1) users/accounts; (2) machines/devices; (3) styluses; (4) hands/fingers and other touch implements; (5) trackpads, (6) touchpads, (7) computer mice and (8) other peripherals; etc. These are non-limiting examples—the disclosure contemplates any input mechanism that can produce ink strokes (straight and otherwise-shaped lines). In high-activity collaborative environments, a very large number of ink strokes may be occurring simultaneously over time. A global unique identifier may therefore be provided to uniquely identify all ink strokes, whatever the source and wherever they are being rendered. This can support a wide range of differentiation-dependent functionality (e.g., by causing strokes to appear differently, providing a particular level of ink-related privileges/security/access to strokes from a given user, etc.). In other examples, the global unique identifier can facilitate the ability of target devices to intelligently control resource allocation among inking and other processes.

Many examples herein support synchronous and incremental rendering at the target device in response to source device ink inputs. Specifically, target ink outputs may be displayed incrementally so as to unfold point-by-point in time—also referred to as "replay" of the source stroke—in the same manner and at the same time as the source ink stroke input that occurs at the local source device. This may provide visual enhancement, smooth output and provide an overall improved experience for participants and viewers.

In many examples, ink strokes may be characterized as "uncommitted" or "committed," also referred to, respectively, as "wet ink" and "dry ink." Uncommitted/wet ink refers to an in-process ink stroke. For example, as a stylus, finger, etc. is moving across a touch display, the rendered line underneath is uncommitted/wet. It is not complete, finished, etc. In contrast, committed/dry ink is what remains after an ink stroke is complete. In many examples, different levels of processing resources (e.g., prioritization of resources) are allocated based on the wet/dry status of the ink data. For example, in some cases, higher computational expense may be allocated to wet ink data in order to ensure that ink is smoothly drawn without lags, gaps, jitter or other undesirable visual artifacts. The smooth quality may be important at both the source and target devices—in both cases the user experience is enhanced when lines are smoothly drawn. Also, it typically will be desirable that the target rendering occur, as close as possible, at exactly the same time and in exactly the same way (direction, shape, speed/velocity, etc.) as the source stroke with which it is associated. Prioritization of wet ink processes may involve the use of more computing resources, faster resources, higher operating frequencies, preferred/high-priority processing threads, etc.

FIGS. 3-4 illustrate an example of multi-device inking collaboration, with unique identifiers being exchanged to differentiate ink stroke data. The identifiers may be additionally used to efficiently control commitment and reallocation of resources (e.g., moving ink to a lower-priority processing thread upon commitment). A general use-case overview will first be presented with respect to FIGS. 3-4, with those figures being described in more detail below. In the example of FIGS. 3 and 4, ink strokes in uncommitted and committed states are shown. The states may arise and end at different times. Duration may vary—a stroke may be in an uncommitted state for a relatively shorter or relatively longer time (e.g., dependent upon how long the tip of a moving stylus is in contact with a touch input surface). Often, an uncommitted stroke is quickly and imperceptibly converted to a committed stroke, for example by replacing the uncommitted stroke with a corresponding committed stroke.

The participating devices in the example FIGS. 3 and 4 are as follows: (1) local computing device 102; (2) remote computing device 104; and (3) second remote computing device 310. The "local" and "remote" terminology is employed here because the example involves ink strokes being initiated at local devices and sent to remote devices. As indicated above, an opposite direction of stroke transmission would yield reverse terminology. Also, as indicated above, when transmitting an ink input, device 102 may be considered a "source" device. The receiving device (e.g., remote device 104 would be a "target" device.

With respect to FIG. 3, it shows the rendering of uncommitted ink strokes 304 and 306, respectively, at local computing device 102 and remote computing device 104.

Remote uncommitted ink stroke 306 is rendered synchronously with local uncommitted ink stroke 304. In other words, within an acceptable level of delay, the target stroke (306) is drawn in the same way, and at the same time, as source stroke (304).

The stroke replication at the target may be referred to as close-in-time, synchronous replay (i.e., of the source stroke). It may also be referred to as incremental replay, in the sense that the target stroke is rendered bit-by-bit (e.g., pixel-wise). Among other data, the source sends an ink stroke path 118 to the target to facilitate replay of the source stroke. Typically, timestamp information is provided, separately or as part of ink stroke path 118, to facilitate incremental rendering. Ink stroke path 118 and other data may include any information to generate stroke geometry and characteristics (direction, curvature, speed, etc.,) associated with the source stroke.

FIG. 4 shows the rendering of a local committed ink stroke 402 and a remote committed ink stroke 404, respectively, on local computing device 102 and remote computing device 104. In some examples, committed rendering occurs in response to specified events, for example the lifting of a stylus from a touch surface of device 102. To differentiate between uncommitted and committed ink strokes from different fingers, users, styluses, devices, etc., a global unique identifier 128, as mentioned above, may be assigned to the ink strokes. The identifier often is used in connection with both committed and uncommitted ink at an ink source device (e.g., local computing device 102).

In many implementations, the global unique identifier is a powerful tool that can differentiate essentially any ink stroke data from any other. This greatly enhances a range of collaborative environments. In some settings, devices send and receive strokes from multiples devices. More than one user may interact with a given device. One user may have multiple devices. Multiple implements (hands, fingers, styluses) may be active at any given device. Different users may have different permissions/security, thus making it of interest to distinguish their strokes.

Even in substantially simpler environments, ink-displaying devices typically strive to efficiently allocate resources. Costly resources often are reserved for more complicated, intensive, high-priority tasks. In many examples herein, use of the global unique identifier enables ink-displaying devices to quickly shift processing resources in advantageous ways. For example, uncommitted ink data may have a higher processing priority than committed ink data. In particular, smooth rendering of in-process ink strokes, without gaps, delay, jitter, or other undesirable visual artifacts may enhance the user experience.

Specifically in one instance, rendering delays may be reduced by assigning uncommitted ink threads a higher processing priority than committed ink threads. Additionally, by assigning a lower processing priority to committed ink threads, processing resources may be conserved at an ink stroke stage where delay is of lesser concern. Consequently the system's processing efficiency is further increased.

Now turning to FIG. 1, the figure depicts an example computing system 100, including a local computing device 102 and a remote computing device 104. The local computing device 102 and the remote computing device 104 are configured to synchronously render ink strokes and enable collaborative interaction between inkers and viewers of ink. Source strokes may be generated in any practicable way—a user may ink a local display 106 with a stylus, finger, hand, mouse, or any other implement. The local display may be a local touch sensitive display, in one example. However in another example, the user may ink the local display via operation other input devices such as a mouse, trackball, trackpad, drawing tablet, etc. In response to the local inking, the ink may be smoothly rendered at the target (remote computing device 104) with reduced delay to enable collaborative interaction between different devices/users/implements while the ink strokes are occurring. As a result, the user's interactive experience is enhanced.

The smooth and synchronous rendering of ink may be achieved via transfer of uncommitted ink data to the remote computing device 104 during execution of the ink stroke. A global unique identifier, as described above, may be associated with both local strokes (i.e., uncommitted and committed). Being thus identified, these ink strokes can be differentiated from other strokes, including (1) other local strokes, such two or more hands or fingers of an individual user, one hand of the user from another hand, another user's hand, a second stylus, etc.; and (2) non-local strokes, originating from any number of different users, hands, touchpads, devices, styluses, etc. It will be appreciated that many devices can send, receive and render ink from almost any source, and efficiently differentiate strokes to provide a high-quality, collaborative user experience. Any type of visual indicator may be used at a target device to differentiate strokes, including color, line width, dashing and like effects; associated icons (e.g., with a user's face or avatar); etc.

Processing resources may be allocated based on whether ink strokes are in-process (uncommitted) or finished (committed). Uncommitted ink may, for example, have a higher priority (e.g., be implemented with faster processing, more memory, higher-priority threads, etc.). The higher priority may be relative to various other processes running on the computer, and specifically may be higher relative to committed ink strokes. Use of the global unique identifier may enable efficient de-prioritization of processing resources quickly (e.g., relegation from uncommitted to committed), such as immediately upon commitment of a stroke. Specifically, the in-process stokes may be more highly prioritized than committed strokes to decrease multi-stroke interference and rendering lag, gaps, interruptions, etc.

Local computing device 102 may include a local ink manager 108. Remote computing device 104 may include a remote ink manager 110. Both ink managers may be configured to process ink inputs from the displays of their associated devices (i.e., local display 106 and remote display 112). It will be appreciated that the remote display 112 may be a touch sensitive display, in one example. However, in other examples, the remote display 112 may receive inking inputs from other devices such as a mouse, trackball, trackpad, drawing tablet, etc. The ink managers may be variously implemented to provide the described functionality, including with one or more components similar to those described in detail with regard to FIG. 5. Though ink inputs may be generated at these and other devices by computer mice and other non-touch mechanisms, touch modalities will often be desirable. To that end, in the present example, touch sensors 113 and 137 may be employed in the depicted devices. Capacitive sensing or any other touch technology may be employed.

FIG. 1 shows an ink input 114 at local display 106. In this and other touch sensitive displays referred to herein, such an input may be applied via a stylus, finger, touchpad, e-pen, or any other touch implement, on or near an input surface of the touch sensitive display. In other examples, non-touch implements may be employed to generate ink inputs, such as computer mice, trackballs, optical methods, etc. In general, the ink inputs contemplated herein include any user input where the user intends to draw or otherwise create a mark on a display. The user may wish to draw a note, sketch a diagram, annotate a presentation, etc. In many examples herein, ink inputs are sent to other devices, and various techniques are used in connection with those inputs and inputs from other sources, to properly identify strokes and enhance collaboration in multi-device, multi-user, and multi-ink input settings.

As ink input 114 occurs, the local ink manager 108 may instruct, as shown at 115, the rendering of a local uncommitted ink stroke on local display 106. For example, in response to a line-drawing motion using a finger, stylus, and/or other suitable input, a corresponding line may be rendered on the local display. Rendering of the local uncommitted ink stroke may begin close in time to (e.g., substantially synchronously with) the beginning of ink input 114.

Local ink manager 108 may generate and send uncommitted ink data 116 to the remote computing device 104 (e.g., to remote ink manager 110). Typically, this is done in response to a local ink input occurring. Further, the transmission may be timed such that the data is sent close in time to (e.g., substantially synchronously with) rendering of the local ink stroke. Accordingly, the remote ink stroke may be rendered incrementally, smoothly, and close in time to the local ink stroke at the local device.

Uncommitted ink data 116 typically includes an ink stroke path 118, which may be represented in various ways. For example, the ink stroke path 118 may include Bezier segments with curved characterizations of stroke shape. This may reduce the quantity of data to be transmitted, which may serve to reduce rendering delays. When Bezier segments are used, the local ink manager 108 may be configured to calculate the Bezier segments based on the X-Y positions of points associated with the ink input. Various conversion methods may be employed to convert between Bezier and X-Y representations. In addition to or instead of Bezier representations, the ink stroke path 118 may include X-Y ink points. In other examples, the ink stroke path 118 may be represented via a plurality of ink segments in a vector space, a bitmap, etc.

In addition to point positions, the uncommitted ink data 116 may further include additional rendering parameters, such as pressure data 120, tilt data 122, and time stamp data 124. The pressure data 120 indicates a pressure associated with the ink input 114 (e.g., via force-sensitive resistors). Tilt data 122 indicates the orientation of the input device (e.g., stylus, finger, etc.,) relative to the touch sensitive display. Additionally, the time stamp data 124 indicates an input time associated with each X-Y coordinate, Bezier segment, etc. In some embodiments, time stamp data may be usable by a remote computing device to reconstruct the timing of a locally executed stroke, such that the stroke is replayed by the remote computing device with the same timing as the locally executed stroke. The rendering parameters discussed above (ink stroke path, time stamp data, etc.,) together may enable smooth rendering of an uncommitted ink stroke on the remote computing device 104 in a way that matches the local uncommitted ink stroke rendering operation.

In prior systems, separate ink strokes implemented at overlapping time intervals and/or in common locations can be conflated. To resolve this problem, the uncommitted ink data 116 also includes a global unique identifier 128. The global unique identifier enables the uncommitted ink data 116 to be associated with a (a) specific computing device, (b) user, and/or (c) touch input (e.g. finger, mouse, stylus, etc.).

The global unique identifier 128 may include an inter-device identifier 130 and a device identifier 131. The inter-device identifier 130 enables a locally-executed ink stroke to be differentiated from other locally-executed ink strokes (e.g., finger strokes, pen strokes, etc.). For instance, a first user may be locally inking with a stylus, corresponding to a first unique inter-device identifier. Meanwhile, a second user may be locally inking with a finger, corresponding to a second unique inter-device identifier. The first and second inter-device identifiers enable these separate ink strokes to be distinguished, and allow the strokes to be simultaneously though independently rendered. A pointer ID may be included in the inter-device identifier to enable differentiation between separate local (a) stylus, (b) finger, and/or (c) mouse inputs. For example, a pointer ID may be assigned to each stylus, finger, mouse, etc., performing local ink inputs. Additionally, a frame ID may also be included in the inter-device identifier. The frame ID enables differentiation of ink strokes occurring in the same location at non-overlapping time intervals. For example, two ink strokes may travel through a common location on the touch screen at separate times. The frame ID provides separate identification of the two ink strokes traveling through the common location. Consequently, ink stroke misinterpretation can be avoided.

Further, the device identifier 131 enables ink strokes generated by one computing device to be differentiated from ink stroke generated by other computing devices. In one example, the device identifier may be a machine ID which is unique to each computing device. For example, a tablet may be assigned a first machine ID and a desktop computer may be assigned a second machine ID, allowing device-level differentiation during collaborative inking. The use of both the device and inter-device identifiers in conjunction enables both locally and remotely executed ink strokes to be separately recognized, allowing for coordinated and synchronous rendering of multiple simultaneous/overlapping ink strokes.

Furthermore, on the local computing device 102 and/or the remote computing device 104, various permissions may be granted to the uncommitted ink data based on the global unique identifier 128. Specifically, applications may use the global unique identifier 128 to trigger different functions. For instance, uncommitted ink data having a specific global unique identifier may be allowed to interact with specified application/specified portions of an application executed by the computing devices. However, uncommitted ink data having a different global unique identifier 128 may have different permissions, and be prevented from interacting with the specified application/application portions. Furthermore, the placement of a particular ink stroke on a display may be based on the particular ink stroke's global unique identifier 128. For instance, global unique identifiers may be assigned to specific portions of the remote display 112 or the local display 106. An ink stroke with a particular global unique identifier may therefore be placed in a specific portion of the display assigned to that particular global unique identifier. Additional permission functions may also be used in conjunction with the global unique identifier 128.

When the uncommitted ink data 116 is received by the remote computing device 104, the remote ink manager may, as shown at 136, instruct the rendering of a remote uncommitted ink stroke. The stroke rendering on remote display 112 may be done in response to receiving the uncommitted ink data 116. It will also be appreciated that uncommitted ink data can be used by the remote computing device 104 to quickly, and with limited delay, create a smooth ink stroke replicating the ink stroke rendered on the local computing device 102. For example, the time stamp 124 and the ink stroke path 118 can be used in conjunction to enable the smooth replay of the uncommitted ink stroke on the remote computing device 104. Moreover, by including the global unique identifier 128 in the uncommitted ink data 116, the remote device can differentiate many different types of ink strokes. These types of ink strokes include, for example: strokes implemented by a single user; strokes implemented by multiple users; strokes generated by the local computing device 102; and/or strokes generated by the remote computing device 104.

The local ink manager 108 may also be configured to replace uncommitted ink strokes with committed ink strokes when an ink stroke commitment input 138 is detected. Such an input may include, for example, lifting a stylus/finger from a display. Responsive to receiving the ink stroke commitment input 138, the local ink manager 108 may be configured to instruct, as shown at 139, the rendering of a local committed ink stroke on the local display 106. In response, the local display 106 may then render the committed ink stroke. Rendering the committed ink stroke may include replacing the uncommitted ink stroke with the committed ink stroke on the local display 106, and then erasing the uncommitted ink stroke. However, other techniques for committed ink stroke rendering have been contemplated. For instance, rendering the committed ink stroke may include converting the uncommitted ink stroke into a committed ink stroke. In such an example, each point, segment, etc., in the uncommitted ink stroke may be reclassified as a committed ink stroke point, segment, etc. Furthermore, rendering the committed ink stroke can also include a shift in the priority of the processing resources used for the ink stroke. For example, the processing priority of the committed ink stroke can be less than the processing priority of the uncommitted ink stroke. In some embodiments, it may be desirable to ensure that, regardless of which particular ink stroke conversion method is utilized, ink stroke conversion is not perceptible to users.

In response to determining ink stroke completion, the local ink manager 108 may send committed ink data 140 to remote computing device 104. The committed ink data 140 may include: (1) the global unique identifier 128, enabling the committed ink stroke to be associated with the uncommitted ink stroke; and (2) an ink commitment command 141. In this way, the global unique identifier 128 can be used to link committed ink data to the uncommitted ink data. And as described elsewhere, the commitment command can trigger a re-allocation of processing resources at the target device.

When the remote computing device 104 receives the committed ink data 140, the remote ink manager 110 may be configured, as shown at 144, to instruct the rendering of a remote committed ink stroke on the remote display 112. As discussed above, commitment can include replacing an uncommitted ink stroke with the committed ink stroke in a manner imperceptible to the user. In some cases, the uncommitted ink stroke is erased in conjunction with rendering the committed ink stroke. In other examples, the uncommitted ink stroke is reclassified as a committed ink stroke.

In both the local and remote computing devices 102 and 104, processing resources may be limited. If processing resources devoted to ink stroke functions are not prioritized, ink stroke presentation may be negatively impacted. For example, users may perceive substantial lag, jitter, and/or other undesirable artifacts during ink stroke rendering. Consequently, non-prioritization of inking resources may detract from an overall user experience. Therefore, various functions associated with collaborative inking on the local and remote computing devices 102 and 104 may be prioritized. For instance, it may be desirable for ink which is currently being drawn (i.e., uncommitted ink) to have a high processing priority. Alternately, ink strokes that have been completed (i.e., committed ink strokes) have a set shape/path that typically remains unchanged, and therefore can be given a lower processing priority. Thus, the committed ink strokes can have a lower processing priority than the uncommitted ink strokes. In one example, the processing priority of uncommitted ink stroke processing threads may be higher than the processing priority of committed ink stroke processing threads. This may apply to both locally and remotely rendered ink strokes. The threads may be processed through various processing components such as APIs, operating systems, etc. By decreasing the processing resources devoted to committed ink strokes, processing resources may be conserved. As a result, the processing efficiency of the computing system is increased without negatively impacting ink stroke presentation.

The local ink manager 108 and the remote ink manager 110 may also be configured to apply various transforms to the locally and remotely rendered ink strokes. Such transforms may be applied both to uncommitted and committed ink strokes. These transforms can include, for example, rotation, shear, scale transform, scale to rectangle, and linear transform, among others. Enabling the application of the aforementioned transforms both locally and remotely may allow a variety of rendering operations to be performed during ink stroke implementation. Consequently, a user's collaborative inking experience is further enhanced.

Furthermore, the local ink manager 108 and the remote ink manager 100 may each be configured to set and retrieve custom properties of the uncommitted and the committed ink strokes. The custom properties provide further expansion of the options for ink rendering. The custom properties may include visual properties of the ink stroke. For example, different ink strokes can be assigned different visual effects on the remote device and/or local device. For example, a user may customize an appearance of a selected ink stroke to resemble an air brush, oil paint, water color, or other conceivable customized effect. Using these tailored visual effects for ink rendering expands the graphical capabilities of the system.

The local ink manager 108 may also be configured to determine when a user has a desire to cancel an ink input. Actions that prompt ink cancellation may include an (a) unintended touch screen contact (e.g., palm contact), (b) a cancellation gesture, etc. Accordingly, an ink stroke cancellation input 142 may be implemented at the local display 106. Responsive to receiving the ink stroke cancellation input 142, the local ink manager 108 is configured to instruct the deletion of the local uncommitted ink stroke 115 on the local display 106. In this way, unintended ink inputs may be erased, and rendering of the local committed ink stroke 139 may be prevented. As a result, unwanted ink stroke commitment is avoided.

The local ink manager 108 is also configured to send ink stroke cancellation data 144 to the remote computing device 104. The ink stroke cancellation data 144 may include the global unique identifier 128, enabling the ink stroke cancellation data to be linked to the uncommitted ink data 116. The ink stroke cancellation data 144 also includes an ink cancellation command 146 instructing the aforementioned ink stroke cancellation.

When the remote computing device 104 receives the ink stroke cancellation data 144, the remote ink manager 110 is configured to instruct removal of the remote uncommitted ink stroke 136. In this way, stroke data can be erased from the remote display 112 when a user has decided to cancel the ink stroke. In such an example, the remote committed ink stroke 144 may not be rendered.

FIGS. 2A-2B show a method 200 for operating a computing system. Method 200 may be implemented via the computing system 100 discussed above with regard to FIG. 1, or may be implemented by another suitable computing system. Method 200 enables stroke differentiation between many ink strokes in a collaborative input scenario. Method 200 additionally provides processing prioritization to decrease ink rendering lag during selected periods, and increase processing efficiency during other selected time periods.

At 202 the method includes initiating an ink input. Initiating an ink input may include a user implementing an ink input on a local display. At 204 the method includes, while the ink input is occurring, rendering a local uncommitted ink stroke on a local display (e.g., local touch sensitive display) based on the ink input. For example, a user may be performing an ink input with a stylus, and the path of the stylus may be locally displayed while the input is occurring.

At 206 the method includes, while the ink input is occurring, sending to a remote computing device uncommitted ink data corresponding to the uncommitted ink stroke. The uncommitted ink data may include an (1) uncommitted ink stroke path and a (2) global unique identifier. The global unique identifier may help differentiate the sent uncommitted ink data from other uncommitted ink data, corresponding to different computing devices and ink inputs. Furthermore, the global unique identifier may enable differentiation of ink data from other ink data corresponding to other remote/local users, fingers, styluses, etc., as previously discussed.

Additionally, the uncommitted ink data may include one or more of a scale operation, a translate operation, and a rotation operation, as well as other transform operations described above. In this way, a variety of rendering operations can be performed during ink stroke implementation, thereby expanding collaborative inking options. In some embodiments, steps 202-206 may be implemented via a local computing device.

At 208 the method includes a remote computing device receiving the uncommitted ink data from the local computing device. Next, at 210, the method includes rendering a remote uncommitted ink stroke in response to receiving the uncommitted ink data. In this way, ink strokes can be practically simultaneously rendered locally and remotely, enabling the remote ink to be synchronously rendered with a reduction in delay as compared to prior systems. Additionally, the remote uncommitted ink stroke may be incrementally rendered based on the uncommitted ink stroke path, at the remote computing device. Consequently, the remote rendering of the ink stroke may be perceived as being substantially smooth and uninterrupted.

At 212 the method includes determining whether an ink stroke commitment input has been received. An ink stroke commitment input may include, for example, the lifting of a finger or stylus from the local display. However, other types of ink stroke commitment inputs have been contemplated, such as a change in input pressure, actuation of a button, etc.

If it is determined that an ink stroke commitment input has been received (YES at 212) the method advances to 214. At 214 the method includes, responsive to receiving an ink stroke commitment input, rendering a local committed ink stroke on the local display. In one example, the local uncommitted ink stroke may be erased in response to rendering the local committed ink stroke. In this way, the committed ink stroke may replace the uncommitted ink stroke.

Next, at 216, responsive to receiving an ink stroke commitment input, the method includes sending to the remote computing device committed ink data. The committed ink data may include: an (1) ink commitment command and the (2) global unique identifier associated with the uncommitted ink stroke path. The ink commitment command may be operative to instruct the rendering of a remote committed ink stroke on a remote display on the remote computing device. Again, the global unique identifier can be used for remote ink stroke differentiation and the ink stroke path can be used for seamless ink rendering. As illustrated, steps 212-216 are implemented via the local computing device.

At 218 the method includes receiving at the remote computing device the committed ink data. Next, at 220, the method includes rendering a remote committed ink stroke in response to receiving the committed ink data.

At 222 the method includes erasing the remote uncommitted ink stroke in response to rendering the remote committed ink stroke. However in other examples, the remote uncommitted ink stroke data may be converted to committed ink stroke data. In some embodiments, steps 218-222 may be implemented by the remote computing device.

If it is determined that an ink stroke commitment input has not been received (NO at 212), the method advances to 224, shown in FIG. 2B. Now referring to FIG. 2B, at 224 the method includes determining if an ink stroke cancellation input has been received. An ink stroke cancellation input may include implementation of a (a) touch gesture, (b) depression of a palm on the touch surface, (c) actuation of a button, etc.

If an ink stroke cancellation input has been received (YES at 224), the method advances to 226. At 226 the method includes, responsive to receiving the ink stroke cancellation input, sending ink stroke cancellation data to the remote computing device, the ink stroke cancellation data including an ink stroke cancellation command and the global unique identifier.

At 228 the method includes receiving at the remote computing device the ink stroke cancellation data. Next, at 230, the method includes erasing the rendered remote uncommitted ink stroke, responsive to receiving the ink stroke cancellation data.

At 232 the method further includes, responsive to receiving the ink stroke cancellation input, erasing the rendered local uncommitted ink stroke. In this way, unwanted or unintended ink strokes can be quickly erased. Additionally, if an ink stroke cancellation input has not been received (NO at 224) the method ends.

Method 200 enables uncommitted ink data to be rapidly sent to the remote computing device during execution of an ink stroke, and through the use of the global unique identifier, differentiated from other ink strokes implemented by other users, styluses, and/or computing devices. Furthermore, by using different processing threads for the committed and uncommitted ink strokes, ink data can be efficiently processed for rapid local and remote rendering of ink strokes while conserving processing resources.

FIGS. 3-4 shows an exemplary sequential inking input scenario. This scenario may be carried out by the following devices: (a) the local computing device 102 having the local display 106, (b) the remote computing device 104 having the remote display 112, and (c) a second remote computing device 310 having a second remote display 312. In the example depicted in FIGS. 3-4, the local display 106 and the remote display 112 both have touch sensitive functionality.

As shown in FIG. 3, a first user 300 implements an ink input with a stylus 302. A local uncommitted ink stroke 304 is rendered by the local computing device 102. A dashed line is used to represent the local uncommitted ink stroke 304, so as to differentiate the local uncommitted ink stroke from other ink strokes. However, it will be appreciated that, in some examples, both uncommitted and committed ink strokes may be identically visually represented on the touch sensitive display.

Meanwhile, a second user 320 implements ink inputs with a stylus 322 and one of their digits 324. Uncommitted ink strokes 326 and 327 are rendered by the second remote computing device 310 based on the ink inputs implemented by the second user 320.

At the same time as the local uncommitted ink stroke 304 is being rendered on the local computing device 102, uncommitted ink data 116 is sent to the remote computing device 104. As previously discussed, the uncommitted ink data may include the global unique identifier 128, the uncommitted ink stoke path 116, as well as other parameter (e.g., pressure data, tilt data, scale operations, translation operations, rotational operations, etc.) Moreover, a second set of uncommitted ink data 328 and a third set of uncommitted ink data 330 is sent to the first remote computing device 104 from the second remote computing device 310.

The second and third sets of uncommitted ink data 328 and 330 correspond to the uncommitted ink strokes 326 and 327 respectively. Further, the second and third sets of uncommitted ink data 328 and 330 each include a different global unique identifier and uncommitted ink stroke path. As previously discussed, the global unique identifiers enable the uncommitted ink stroke data to be differentiated from ink data corresponding to other users and/or styluses locally implemented and/or remotely implemented on other computing devices. As a result, a large number of users can simultaneously participate in collaborative inking on collectively rendered user interfaces, improving the overall collaborative experience.

Responsive to receiving the uncommitted ink data 116, the remote computing device 104 renders a remote uncommitted ink stroke 306 substantially identical to the local uncommitted ink stroke 304. It will be appreciated that the local uncommitted ink stroke 304 and remote uncommitted ink stroke 306 may be rendered substantially simultaneously. It will also be appreciated that, due to the rendering parameters described above, the remote uncommitted ink stroke 306 may be rendered relatively smoothly and without interruption as compared to previous collaborative ink rendering systems. Moreover, the remote uncommitted ink stroke 306 may be rendered with decreased delay when the threads associated with the uncommitted ink data in the remote computing device have a higher priority than other processing threads.

Additionally, responsive to receiving the second set of uncommitted ink data 328 and the third set of uncommitted ink data 330, the remote computing device 104 may render a second remote uncommitted ink stroke 340 and a third uncommitted ink stroke 342. The second remote uncommitted ink stroke 340 corresponds to the uncommitted ink stroke 326, and the third remote uncommitted ink stroke 342 corresponds to the uncommitted ink stroke 327.

Next in FIG. 4, which illustrates an instance in time subsequent to the ink input operation shown in FIG. 3, the ink input is completed. Completion of the ink input in this case is signified by the first user 300 lifting the stylus 302 from a touch surface 400 of the local display 106. However, other actions may signify completion of the ink input.

Responsive to completion of the ink input, the local computing device 102 renders a local committed ink stroke 402. It will be appreciated that the local committed ink stroke 402 replaces the local uncommitted ink stroke 304, shown in FIG. 3. The local committed ink stroke 402 is depicted in FIG. 4 as a solid line in order to differentiate the local committed ink stroke 402 from the local uncommitted ink stroke 304. However, as previously discussed, the uncommitted and committed ink strokes may be visually identical. Committed ink data 140, including the global unique identifier 128 and the ink commitment command 141, is sent to the remote computing device responsive to determining completion of the uncommitted ink stroke 304.

After receiving the committed ink data 140, the remote computing device renders a remote committed ink stroke 404 substantially identical to the local committed ink stroke 402. Further, the remote uncommitted ink stoke 306 may be erased in response to rendering the remote committed ink stroke 404, thereby replacing the uncommitted ink stroke.

Additionally, as shown in FIG. 4, the second user 320 also completes the ink inputs executed on the second remote computing device 310. Accordingly, the second remote computing device 310 renders a first committed ink stroke 406 and a second committed ink stroke 408 in response to completion of the ink inputs.

A second set of committed ink data 410 and a third set of committed ink data 412 is sent to the remote computing device 104 from the second remote computing device 310 in response to completion of the ink inputs. It will be appreciated that the second set of committed ink data 410 includes the second global unique identifier and a second ink commitment command. Likewise, the third set of committed ink data 412 includes the third global unique identifier and a third ink commitment command. The remote computing device 104 renders a second remote committed ink stroke 414 in response to receiving the second set of committed ink data 410. Likewise, the remote computing device 104 renders a third remote committed ink stroke 416 in response to receiving the third set of committed ink data 412.

It will be appreciated that the global unique identifiers associated with the different committed ink inputs enable the remote computing device 104 to differentiate between the remote committed ink strokes 404, 414, and 416. Consequently, a large number of users can collaboratively ink without the system conflating ink strokes, thereby improving the collaborative interaction between the users.

In some embodiments, the methods and processes described herein may be tied to a computing system of one or more computing devices. In particular, such methods and processes may be implemented as a computer-application program or service, an application-programming interface (API), a library, and/or other computer-program products.

Figure 5:
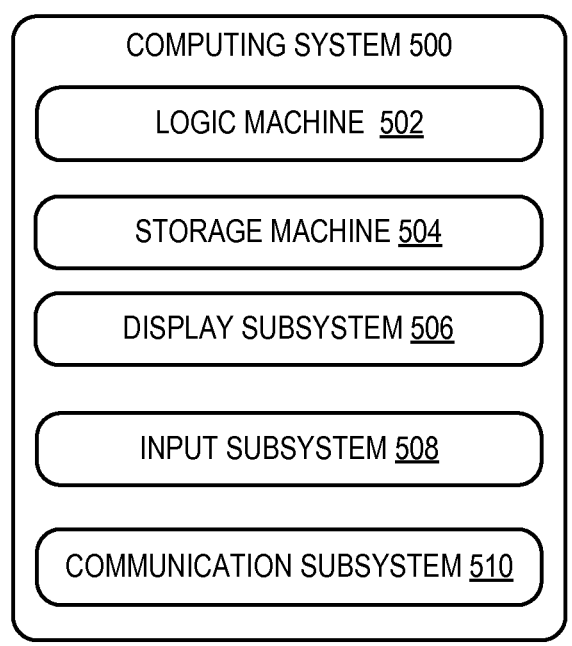
FIG. 5 depicts an example computing system, one or more components of which may be used to implement the example systems and methods of FIGS. 1-5.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold or store instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

The subject matter of the present disclosure is further described in the following paragraphs. According to one aspect a method for operating a computing system is provided. The method includes at a local computing device and while an ink input is occurring, rendering a local uncommitted ink stroke on a local display based on the ink input; sending uncommitted ink data corresponding to the local uncommitted ink stroke to a remote computing device, the uncommitted ink data including an uncommitted ink stroke path and a global unique identifier differentiating the uncommitted ink data from other uncommitted ink data corresponding to different computing devices and different ink inputs; and responsive to receiving an ink stroke commitment input, rendering a local committed ink stroke on the local display and sending committed ink data including an ink commitment command and the global unique identifier associated with the uncommitted ink stroke path to the remote computing device, the ink commitment command being operative to request the rendering of a remote committed ink stroke on a remote display on the remote computing device.

In this aspect, a local uncommitted ink stroke processing thread corresponding to the local uncommitted ink stroke may have a higher processing priority than a local committed ink stroke processing thread corresponding to the local committed ink stroke.

In this aspect, a remote uncommitted ink stroke processing thread corresponding to a remote uncommitted ink stroke may have a higher processing priority than a remote committed ink stroke processing thread corresponding to the remote committed ink stroke.

In this aspect, the method may further include, at the remote computing device, rendering a remote uncommitted ink stroke based on and in response to receiving the uncommitted ink data and rendering a remote committed ink stroke based on and in response to receiving the committed ink data.

In this aspect, the method may further include, at the remote computing device, erasing the remote uncommitted ink stroke in response to rendering the remote committed ink stroke.

In this aspect, the remote uncommitted ink stroke may be incrementally rendered at the remote computing device based on the uncommitted ink stroke path.

In this aspect, the method may further include, at the local computing device receiving an ink stroke cancellation input, and responsive to receiving the ink stroke cancellation input, erasing the rendered local uncommitted ink stroke and sending ink stroke cancellation data to the remote computing device, the ink stroke cancellation data including an ink cancellation command and the global unique identifier.

In this aspect, the global unique identifier may differentiate the uncommitted ink data and the committed ink data from ink data corresponding to other users, fingers, pens, erasers, and/or peripheral device pointers remotely performing inputs on other remote computing devices.

In this aspect, the global unique identifier may differentiate the uncommitted ink data and the committed ink data from ink data corresponding to other users and/or styluses locally implemented.

In this aspect, the uncommitted ink data may include one or more of a scale operation, a translate operation, and a rotation operation.

In this aspect, the global unique identifier may include an inter-device identifier and a device identifier.

According to another aspect, a computing system is provided. The computing device includes a local computing device including a local storage machine holding instructions that cause a local logic machine to: while an ink input is occurring, render a local uncommitted ink stroke on a local display based on the ink input; send uncommitted ink data corresponding to the local uncommitted ink stroke to a remote computing device, the uncommitted ink data including an uncommitted ink stroke path and a global unique identifier differentiating the uncommitted ink data from other uncommitted ink data corresponding to different computing devices and different ink inputs; and if an ink stroke commitment input is received, render a local committed ink stroke on the local display and send, to the remote computing device, committed ink data including an ink commitment command and the global unique identifier associated with the uncommitted ink stroke path, the ink commitment command being operative to request the rendering of a remote committed ink stroke on a remote display on the remote computing device.

In this aspect, the instructions may be further configured to cause the local logic machine to, if an ink stroke cancellation input is received, erase the rendered local uncommitted ink stroke and send ink stroke cancellation data including an ink cancellation command and the global unique identifier to the remote computing device, the ink cancellation command being operative to request the removal of a remote uncommitted ink stroke from the remote display.

In this aspect, a local uncommitted ink stroke processing thread, may correspond to the local uncommitted ink stroke and may have a higher processing priority than a local committed ink stroke processing thread, corresponding to the local committed ink stroke, and in which a remote uncommitted ink stroke processing thread, may correspond to the remote uncommitted ink stroke and may have a higher processing priority than a remote committed ink stroke processing thread, corresponding to the remote committed ink stroke.

In this aspect, the remote computing device may include a remote storage machine holding instructions that cause a remote logic machine to in response to receiving the uncommitted ink data, render a remote uncommitted ink stroke based on the uncommitted ink data to in response to receiving the committed ink data, render a remote committed ink stroke on the remote display based on the committed ink data.

In this aspect, the instructions may be further configured to cause the remote logic machine to erase the remote uncommitted ink stroke in response to receiving an ink cancellation command.

In this aspect, the global unique identifier may include an inter-device identifier and a device identifier.

According to another aspect, a method for operating a computing system is provided. The method includes at a local computing device and while an ink input is occurring, rendering a local uncommitted ink stroke on a local display based on the ink input; sending uncommitted ink data corresponding to the local uncommitted ink stroke to a remote computing device, the uncommitted ink data including an uncommitted ink stroke path and a global unique identifier including an inter-device identifier and a device identifier differentiating the uncommitted ink data from other uncommitted ink data corresponding to different computing devices and different ink inputs, the global unique identifier associated with the uncommitted ink stroke path; if an ink stroke commitment input is received, render a local committed ink stroke on the local display and send, to the remote computing device, committed ink data including an ink commitment command and the global unique identifier associated with the uncommitted ink stroke path, the ink commitment command being operative to request the rendering of a remote committed ink stroke on a remote display on the remote computing device; and if an ink stroke cancellation input is received at the local computing device, erasing the rendered local uncommitted ink stroke and sending ink stroke cancellation data including an ink cancellation command and the global unique identifier to the remote computing device, the ink cancellation command being operative to request the removal of a remote uncommitted ink stroke from the remote display.

In this aspect, a local uncommitted ink stroke processing thread, may correspond to the local uncommitted ink stroke and may have a higher processing priority than a local committed ink stroke processing thread corresponding to the local committed ink stroke, and in which a remote uncommitted ink stroke processing thread may correspond to the remote uncommitted ink stroke and may have a higher processing priority than a remote committed ink stroke processing thread, corresponding to the remote committed ink stroke.

In this aspect, the method may further include at the remote computing device, in response to receiving the uncommitted ink data, rendering a remote uncommitted ink stroke based on the uncommitted ink data and in response to receiving the committed ink data, replacing the remote uncommitted ink stroke with a remote committed ink stroke on the remote display based on the committed ink data.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for operating a computing system comprising:
   at a local computing device and while an ink input is occurring, rendering a local uncommitted ink stroke on a local display based on the ink input;
   sending uncommitted ink data corresponding to the local uncommitted ink stroke to a remote computing device, the uncommitted ink data including an uncommitted ink stroke path and a global unique identifier differentiating the uncommitted ink data from other uncommitted ink data corresponding to different computing devices and different ink inputs; and
   responsive to receiving an ink stroke commitment input, rendering a local committed ink stroke on the local display and sending committed ink data including an ink commitment command and the global unique identifier associated with the uncommitted ink stroke path to the remote computing device, the ink commitment command being operative to request the rendering of a remote committed ink stroke on a remote display on the remote computing device, wherein a local uncommitted ink stroke processing thread corresponding to the local uncommitted ink stroke has a higher processing priority than a local committed ink stroke processing thread corresponding to the local committed ink stroke.

2. The method of claim 1, in which a remote uncommitted ink stroke processing thread corresponding to a remote uncommitted ink stroke has a higher processing priority than a remote committed ink stroke processing thread corresponding to the remote committed ink stroke.

3. The method of claim 1, further comprising, at the remote computing device, rendering a remote uncommitted ink stroke based on and in response to receiving the uncommitted ink data and rendering a remote committed ink stroke based on and in response to receiving the committed ink data.

4. The method of claim 3, further comprising, at the remote computing device, erasing the remote uncommitted ink stroke in response to rendering the remote committed ink stroke.

5. The method of claim 3, in which the remote uncommitted ink stroke is incrementally rendered at the remote computing device based on the uncommitted ink stroke path.

6. The method of claim 1, further comprising, at the local computing device receiving an ink stroke cancellation input, and responsive to receiving the ink stroke cancellation input, erasing the rendered local uncommitted ink stroke and sending ink stroke cancellation data to the remote computing device, the ink stroke cancellation data including an ink cancellation command and the global unique identifier.

7. The method of claim 1, in which the global unique identifier differentiates the uncommitted ink data and the committed ink data from ink data corresponding to other users, fingers, pens, erasers, and/or peripheral device pointers remotely performing inputs on other remote computing devices.

8. The method of claim 1, in which the global unique identifier differentiates the uncommitted ink data and the committed ink data from ink data corresponding to other users and/or styluses locally implemented.

9. The method of claim 1, in which the uncommitted ink data includes one or more of a scale operation, a translate operation, and a rotation operation.

10. The method of claim 1, in which the global unique identifier includes an inter-device identifier and a device identifier.

11. A computing system comprising:
    a local computing device including a local storage machine holding instructions that cause a local logic machine to:
       while an ink input is occurring, render a local uncommitted ink stroke on a local display based on the ink input;
       send uncommitted ink data corresponding to the local uncommitted ink stroke to a remote computing device, the uncommitted ink data including an uncommitted ink stroke path and a global unique identifier differentiating the uncommitted ink data from other uncommitted ink data corresponding to different computing devices and different ink inputs; and
       if an ink stroke commitment input is received, render a local committed ink stroke on the local display and send, to the remote computing device, committed ink data including an ink commitment command and the global unique identifier associated with the uncommitted ink stroke path, the ink commitment command being operative to request the rendering of a remote committed ink stroke on a remote display on the remote computing device, wherein a local uncommitted ink stroke processing thread corresponding to the local uncommitted ink stroke has a higher processing priority than a local committed ink stroke processing thread corresponding to the local committed ink stroke.

12. The computing system of claim 11, in which the instructions are further configured to cause the local logic machine to, if an ink stroke cancellation input is received, erase the rendered local uncommitted ink stroke and send ink stroke cancellation data including an ink cancellation command and the global unique identifier to the remote computing device, the ink cancellation command being operative to request the removal of a remote uncommitted ink stroke from the remote display.

13. The computing system of claim 11, in which a remote uncommitted ink stroke processing thread, corresponding to the remote uncommitted ink stroke, has a higher processing priority than a remote committed ink stroke processing thread corresponding to the remote committed ink stroke.

14. The computing system of claim 11, in which the remote computing device includes a remote storage machine holding instructions that cause a remote logic machine to in response to receiving the uncommitted ink data, render a remote uncommitted ink stroke based on the uncommitted ink data to in response to receiving the committed ink data, render a remote committed ink stroke on the remote display based on the committed ink data.

15. The computing system of claim 14, in which the instructions are further configured to cause the remote logic machine to erase the remote uncommitted ink stroke in response to receiving an ink cancellation command.

16. The computing system of claim 11, in which the global unique identifier includes an inter-device identifier and a device identifier.

17. A method for operating a computing system comprising:
   at a local computing device and while an ink input is occurring, rendering a local uncommitted ink stroke on a local display based on the ink input;
   sending uncommitted ink data corresponding to the local uncommitted ink stroke to a remote computing device, the uncommitted ink data including an uncommitted ink stroke path and a global unique identifier including an inter-device identifier and a device identifier differentiating the uncommitted ink data from other uncommitted ink data corresponding to different computing devices and different ink inputs, the global unique identifier associated with the uncommitted ink stroke path;
   if an ink stroke commitment input is received, render a local committed ink stroke on the local display and send, to the remote computing device, committed ink data including an ink commitment command and the global unique identifier associated with the uncommitted ink stroke path, the ink commitment command being operative to request the rendering of a remote committed ink stroke on a remote display on the remote computing device, wherein a local uncommitted ink stroke processing thread corresponding to the local uncommitted ink stroke has a higher processing priority than a local committed ink stroke processing thread corresponding to the local committed ink stroke; and
   if an ink stroke cancellation input is received at the local computing device, erasing the rendered local uncommitted ink stroke and sending ink stroke cancellation data including an ink cancellation command and the global unique identifier to the remote computing device, the ink cancellation command being operative to request the removal of a remote uncommitted ink stroke from the remote display.

18. The method of claim 17, in which a remote uncommitted ink stroke processing thread, corresponding to the remote uncommitted ink stroke, has a higher processing priority than a remote committed ink stroke processing thread corresponding to the remote committed ink stroke.

19. The method of claim 17, further comprising, at the remote computing device, in response to receiving the uncommitted ink data, rendering a remote uncommitted ink stroke based on the uncommitted ink data and in response to receiving the committed ink data, replacing the remote uncommitted ink stroke with a remote committed ink stroke on the remote display based on the committed ink data.

* * * * *